Oct. 13, 1959   L. A. MAYBARDUK   2,908,188
MECHANICAL INTEGRATOR
Filed May 28, 1954
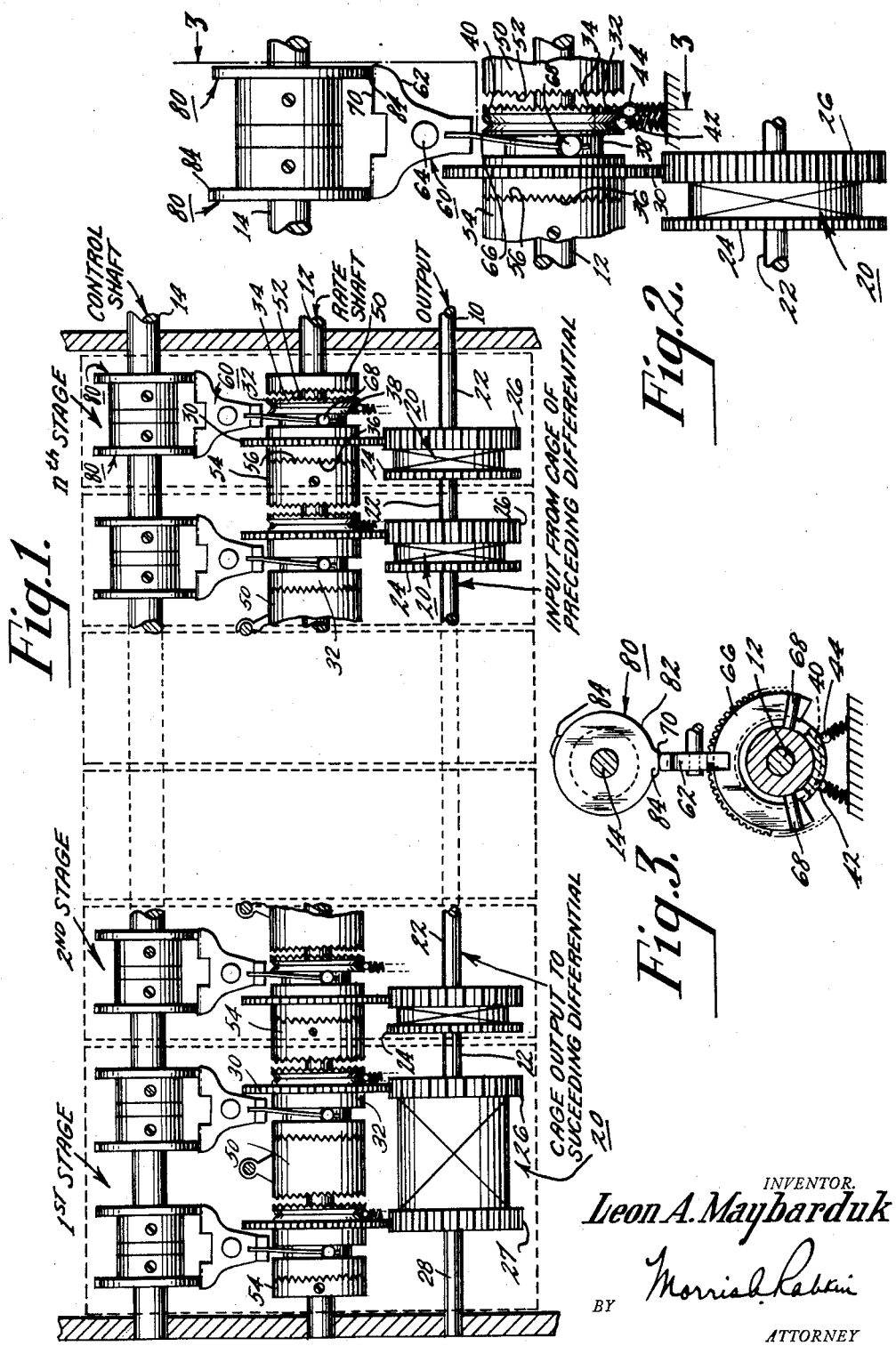
INVENTOR.
Leon A. Maybarduk
BY
ATTORNEY

2,908,188

MECHANICAL INTEGRATOR

Leon A. Maybarduk, Haddonfield, N.J., assignor, by mesne assignments, to the United States of America as represented by the Secretary of the Air Force Application May 28, 1954, Serial No. 433,001

4 Claims. (Cl. 74—674)

This invention relates to mechanical integrating mechanisms, and particularly to positively driven mechanical integrators.

In many modern computing and navigating systems, one function must be integrated with respect to another rapidly, reliably, and accurately. In airborne navigation equipment of the Shoran type, for example, a variable represented as an angular position must be integrated with respect to a variable represented as a rate of rotation. Prior art systems, however, are not wholly satisfactory for such applications. Electrical circuits for integrating, for example, operate within limits and thus are restricted to a range of values. Such circuits also commonly require complex arrangements to manipulate a wide range of values accurately. Mechanical integrators are also known. Most of these, such as friction-wheel, double-ball, and cylinder-sphere-disc integrators, rely on frictional contacts and lever-arm movements. To attain high accuracy, these integrators must usually be extremely large.

Accordingly, positively driven integrators have been developed for performing integrations in airborne equipment. One such integrator is shown and described in my copending application for patent entitled, "Mechanical Integrator," Serial No. 371,510, filed July 31, 1953 and assigned to the assignee of the present invention. The integrator described in the above-mentioned application is extremely compact, light in weight, and accurate over its range. The integrator employs input shafts within successive stages. The inputs are responsive to a continuously varying parameter and are coupled together so as to have successively reduced rates of rotation to represent a sequence of orders of value, such as successive decades. An output shaft parallel to each input carries a plurality of freely rotating driven gears which are turned at progressively varying speeds, such as unit increments within a decade, by separate driving gears fixed on the input shaft. Two-way clutches mounted on each output shaft between each pair of driven gears can engage either of the pair to rotate the output shaft at incremental variations of the input shaft rotation. Individual cams, mounted on a cam shaft parallel to the input and output shafts, drive the clutches into engagement with the gears to maintain a constant rotation or to represent an incrementally varying parameter. The output rotations are combined in a differential system in which the first input rotation is employed additionally to produce a double range of incremental values. The resultant output parameter is the integral of a continuously varying parameter and an incrementally varying parameter.

The device described in the above-mentioned application, in effect, finds an area under a curve (integrates the values represented by the curve) by following the curve in step-wise fashion. The device described has an accuracy greater than one part in 2000, this being sufficient for many applications. In certain other uses, however, even greater accuracy is sought, sometimes to the extent of one part in a million. To achieve such accuracy with successive decades, however, would require an extremely high number of gears and associated equipment. A binary or two-valued system, however, may be advantageously employed for providing the required high accuracy. One known system employs a number of differentials coupled together in a chain to represent successive orders of value in a binary scheme. Differentials of many well known types characteristically provide outputs (cage rotations) which are one-half the algebraic sum of two input rotations. The cage of each differential in the chain of the mentioned system is thus coupled directly to one input of the next differential in the chain. An input rotation applied to the first differential of the cascade is reduced successively by halves at the succeeding differentials if the one remaining input of each differential is held against rotation. The successive reductions in speed correspond to the values in a binary progression of numbers, in which successive digits represent successive negative powers of two. Where, in the binary system the 14th digit represents $2^{-14}$ power, in the chain of differentials, the 14th differential represents the 14th one-half reduction in speed, or a reduction by $2^{-14}$. In the binary fractional system of notation employing a binary point, numerical fractional values are represented by various combinations of the powers of two. For example, binary number .101011 is the equivalent of decimal forty-three times $2^{-6}$ ($43 \times \frac{1}{64}$), because the binary number 101011 represents the sum of $2^5$ (32), $2^3$ (8), $2^1$ (2), and $2^0$ (1), and the binary point indicates the inverse of the sixth power of two should multiply this sum. The final rotation derived from a chain of differentials may likewise represent a numerical value (between zero and unity). As an example, consider the following table, which sets forth numerically the final rotation obtained when the free inputs of a chain of four differentials are driven (at unity speed) or held in various combinations. (A binary "1" represents a rotative speed of unity, and a binary "0" represents a zero rotation.)

| Differential | 1st Input | 1 | 2nd Input | 2 | 3 | 4 (Final) |
|---|---|---|---|---|---|---|
| Speed of input | 1 | | 0 | 0 | 0 | 0 |
| Speed of output | | ½ | | ¼ | ⅛ | ¹⁄₁₆ |
| Speed of input | 1 | | 1 | 0 | 0 | 0 |
| Speed of output | | 1 | | ½ | ¼ | ⅛ |
| Speed of input | 1 | | 0 | 1 | 0 | 0 |
| Speed of output | | ½ | | ¾ | ⅜ | ³⁄₁₆ |
| Speed of input | 1 | | 1 | 1 | 0 | 0 |
| Speed of output | | 1 | | 1 | ½ | ¼ |
| Speed of input | 1 | | 0 | 0 | 1 | 0 |
| Speed of output | | ½ | | ¼ | ⅝ | ⁵⁄₁₆ |

In this example, the operation of the first differential must be distinguished from that of the remainder. The first differential has two free inputs, where the other differentials have only one free input. The first differential can accordingly provide three output possibilities, 0, ½, 1, corresponding respectively to both inputs zero, one input at unit speed and one zero, and both inputs at unit speed.

Heretofore, however, a completely satisfactory mechanism has not been evolved for selecting and actuating the inputs of the chain of differentials. To provide sufficient accuracy, the change-over between holding and driving of differential inputs should be accomplished very rapidly, without gear clash or slippage. Various attempts have been made to solve this change-over problem, some using a second arrangement of differentials corresponding to the first and having separate holding mechanisms of considerable complexity. Such arrangements have not heretofore provided the desired speed, reliability, or economy.

Accordingly, an object of this invention is to provide an improved, positively driven, mechanical integrator which is simpler, more rapid and more reliable than integrators heretofore known.

Another object of this invention is to provide an improved mechanical integrator of the type employing a chain of differentials, which integrator employs a simple, efficient, and compact arrangement for actuating the differentials in the chain.

Yet another object of this invention is to provide an improved selecting and control arrangement for a mechanical integrator of the type employing a chain of differentials, which arrangement responds to the angular position of an input shaft to alternatively drive or hold inputs of the differentials more efficiently than the mechanisms heretofore known.

Another object of this invention is to provide an improved mechanical integrator having an extremely high accuracy while characterized by economy, compactness, and simplicity of design.

A further object of this invention is to provide an improved mechanism for alternatively driving or holding an input of a differential, which mechanism is characterized by extreme rapidity, reliability, simplicity, and resistance to wear.

According to one exemplification of the invention, a number of differentials are coupled in a chain from cage output to a succeeding differential input so as to provide successively halved outputs when the remaining differential inputs are held. An input rate shaft which rotates at variable speed is mounted parallel to the arrangement of differentials. Along the rate shaft are successive pairs of clutches, one pair corresponding to each differential. One clutch of each pair is a fixed holding clutch and the other is a driving clutch fixed to the rate shaft. Between each pair of clutches and freely mounted on the rate shaft is a clutch hub having a gear surface continuously engaging one input of the corresponding differential. The clutch hub has a toothed surface on each side and is moved against a similar surface on either the driving clutch or the holding clutch by a pivoted shifting lever. The shifting lever, in turn, is pivoted by cams mounted on a control shaft, the angular position of which represents a second variable. Cam lobes are so placed with relation to each other on the cams that, at each angular position, the inputs of a certain combination of differential gears are held and the remainder are driven. A detent mechanism provides rapid and positive shifting between the driving and holding actions.

The novel features of the invention, as well as the invention itself, both as to its organization and method of operation, will best be understood from the following description, when read in connection with accompanying drawings, in which like reference numerals refer to like parts, and in which:

Fig. 1 is a side elevation of one mechanism for practicing the present invention and which employs a number of stages; and Figs. 2 and 3 are side and end views, respectively, of the mechanisms within the individual stages of Fig. 1.

A mechanism (refer to Fig. 1) for practicing the invention employs a number of individual stages. The stages are enclosed within dotted line boxes and are identified in correspondence to the binary place they represent. Thus, the highest order of stage is termed the 1st stage, the next stage is called the 2nd stage, and so on to the $n$th stage. Because the number of stages which are employed may vary as desired, and for clarity in the drawing, the intermediate stages are indicated only by dotted lines.

Each stage from the second to the $n$th may include a well known differential 20 having two inputs 24, 26 and a cage output 22. The two differential inputs 24, 26 are represented as gear inputs, the body of the differential is represented by a conventional differential symbol, and the output of the differential 20 is represented as an output shaft 22. The rotation of the output shaft 22 is the same as that of the cage. When the inputs 24, 26 are rotated, the cage rotates with a speed which is equal to one-half the algebraic sum of the rotations of the two inputs. In Fig. 1, the differentials are connected together in a chain to cascade the stages. The differentials are mounted in line, and the output shaft 22 of each differential 20 is coupled to one input 24 of the succeeding differential in the line. Gear teeth are shown on each input 24 coupled to the output shaft 22 of the preceding differential 20 only for clarity in the drawing, and the gear teeth thus illustrated may accordingly be omitted. The corresponding input 24 will hereinafter, for descriptive purposes, be termed the shaft input 24 of the differential 20.

The cage of the final differential (that of the $n$th stage) drives an output shaft 10, the rotation of which represents the output of the system. Inputs to the system are provided by a rate shaft 12 and a control shaft 14, each of which is substantially parallel to the line of differentials. The rate shaft 12 is responsive to a variable input quantity which is expressed as a variable rate of rotation. This rotation may be said to represent a continuous parameter. The control shaft 14 is responsive to a variable input quantity represented by varying angular positions. The continuous parameter provided to the control shaft 14 is converted to an incrementally varying parameter by selecting and driving mechanisms to be herein described.

The stages each include a clutching mechanism, a selector mechanism, and the previously mentioned differential. Each of the stages is alike, except that the highest order stage has an additional arrangement because of its position in the chain. Only one of the stages other than the $n$th stage is, therefore, described in detail, and so far as applicable the description is not repeated with respect to that stage.

In a stage, such as the $n$th stage, is mounted a differential 20 having an output shaft 22, a shaft input 24, and a gear input 26 coupled to the differential of the preceding stage as previously described. Within each stage also is a driving gear 30 mounted on a clutch hub 32 concentric with the rate shaft 12. The clutch hub 32 is free to rotate about the rate shaft 12 and has two toothed facing elements 34, 36, one on each side of the clutch hub 32. The sets of teeth face away from each other and outward from a plane normal to the longitudinal axis of the rate shaft 12. The driving gear 30 fixed to the clutch hub 32 is in continuous engagement with the input gear 26 of the differential 20. The clutch hub 32 includes also a circumferential ring 38 and a detent groove 40 (see Fig. 2) concentric with the rate shaft 12.

Also included in the clutching mechanism as shown in Fig. 1 are holding and driving clutches 50, 54, respectively, mounted concentrically about the rate shaft 12. The stationary holding clutch 50 has a toothed facing element 52 opposing the similar element 34 on the clutch hub 32. The driving clutch 54 within each stage is fixed to and rotates with the rate shaft 12, and has a toothed facing element 56 opposing the similar element 36 on the adjacent side of the clutch hub 32. Because the clutch hub 32 is free to move reciprocally along the rate shaft 12, either one of the sets of facing elements 34, 36 may individually contact and mesh with the corresponding element 52, 56 on the holding clutch 50 and driving clutch 54.

The selecting mechanism of each stage includes a pivoted shifting lever 60 for moving the clutch hub 32 longitudinally along the rate shaft 12 as desired. The shifting lever body 62 turns freely about a fixed pivot pin 64. A pair of resilient arms 66 fixed to the shifting lever body 62 extend down around the circumferential ring 38 in the clutch hub 32. An engaging pin 68 at the end of each arm 66 rides within the circumferential ring 38 at each side of the clutch hub 32. On the opposite side of the pivot pin 64 from the resilient arms 66, the lever body 62 has a pair of cam follower surfaces 70 approximately parallel to the rate shaft 12 longitudinal axis. Note that when the cam follower surfaces 70 are given a limited rotation or rocked about pivot 64, the shifting lever body 62 and resilient arms 66 have a rocking motion about the pivot pin 64 and the clutch hub 32 reciprocates along the rate shaft 12. A further part of the selecting mechanism in each stage is a pair of cams 80 (see also Figs. 2 and 3) mounted on the control shaft 14, each in registry with a different one of the cam follower surfaces 70 on the shifting lever 62. The cams 80 have cam dwell 82 and cam lobe portions 84 placed in such angular position with respect to the control shaft 14 that only one of the cam follower surfaces 84 is turned down at a given control shaft 14 position.

The differential 20 in the highest order, or 1st stage differs from the other differentials in that both its inputs can be either driven or held stationary. A gear input 26 of the 1st stage differential 20 may be turned by the driving gear 30 and associated mechanism of that stage in the same manner as in the other stages. In addition, however, the 1st stage includes a second gear input 27 on the differential 20 and a separate selector and driving mechanism for controlling the second gear input 27. The gear teeth on the input 27 are accordingly utilized in the 1st stage, but not on the inputs 24 in the remaining stages.

Further features of the selecting and clutching mechanism may be seen in the detailed views (refer to Figs. 2 and 3). The circumferential detent groove 40 is on one side of the circumferential ring 38. A pair of spring loaded detent balls 42, 44 are mounted in operative relation to the detent groove 40. The detent balls 42, 44 are spaced apart in the direction of the longitudinal axis of the rate shaft 12 so as to nest separately in the groove 40, depending upon the position of the clutch hub 32 along the rate shaft 12. The detent arrangement provides alternate positions of stability for the clutch hub 32. In one position one set of clutch hub 32 facing elements 34 mesh with the facing elements 52 on the holding clutch 50, and in the other position the other set of clutch hub 32 facing elements 36 mesh with the facing elements 56 of the driving clutch 54.

As shown, the cams 80 have a considerable cam dwell 82 portion and a relatively small cam lobe 84 portion. The cam follower surface 70 on the shifting lever 60 describes an arc in a plane including the axis of rotation of the cams 80. A relatively gentle sloping of the cam lobe 84 may be employed, because shifting action is primarily supplied by the resilient arms 66 on the shifting lever 60 and the detent arrangement on the clutch hub 32. The clutch hub 32 remains in engagement with either clutch 50 or 54 until the spring force exerted by the flexure of the resilient arms 66 is sufficient to overcome the resistance of the detent 42 or 44. The clutch hub 32 then shifts quickly to the other alternate position to engage the other detent ball.

In operation (refer to Fig. 1) the system output is derived from the differential rotations imparted from the rate shaft 12 as controlled by the clutching and selector mechanisms. For purposes of illustration, the rate shaft 12 may be assumed to rotate continuously, though variably, during operation. During this time, the control shaft 14 may also change angular position. At different angular positions of the control shaft 14 given cam lobes 84 are down, pivoting the associated shifting levers 60. Between these control shaft 14 angular positions neither cam lobe 84 may be down in a stage. In such a condition, however, the detent arrangement in the stage retains the shifting lever 60 and clutch hub 32 in its last previous position. The detent arrangements in effect retain the last previous setting until the control shaft 14 has turned a discrete amount. The resilient arms 66 are then flexed sufficiently to cause a rapid snap-action movement of the clutch hub 32. The action is rapid even though the control shaft 14 may turn slowly.

The general action is that of following a curve stepwise by varying incrementally the output rotation derived from the rate shaft 12. Each angular position of the control shaft 14 provides a different binary combination. With each control shaft 14 position the clutch hubs 32, controlled by the shifting levers 60 and cams 80, are engaged in a certain pattern to the driving and the holding clutches 54 and 50. When a clutch hub 32 engages the holding clutch 50 the driving gear 30 is stationary and may be said to have a binary "0" rotation. In its alternate position, the clutch hub 32 and driving gear 30 are driven by the driving clutch 54 at the speed of the rate shaft 12. In this position the driving gear 30 and differential input 26 may be said to have a binary "1" rotation. Reference may be made here to the previously given table for an example of the binary configurations which may be employed, and the manner in which these configurations provide incremental changes in output.

As the rate and control shafts 12, 14 rotate, therefore, the rotation of the output shaft 10 reflects the changes in both variables. The total revolutions of the output shaft 10 represent the output of the system, and the result of the integration. The simplest case of integration is that in which both variables are constant, in which case the system operates as a gear ratio changer.

The employment of two input controls for the differential 20 of the first stage provides the equivalent of an additional stage because the first stage may provide 0, ½, or 1 rotations. The input shaft 28 in the first stage may of course be immobilized or turned constantly. The same range of values, however, would not then be provided even with an additional stage. With one input statically immobilized a unity output shaft rotation could not be provided, and with one input continually driven a zero output shaft rotation could not be provided. Note that the multiplicity of teeth employed on the clutch surfaces minimize the effects of individual tooth deformation and wear. Further advantages are derived from this arrangement because the spacing between the teeth on the clutches and clutch hub need only be very small. The spacing need be only that required to permit clearance of the teeth on the clutch hub from the teeth on the unengaged clutch. Because of this small clearance, only a very small movement is required between the two alternate positions of the clutch hub. Thus, the interval of idleness between engagement and holding positions, and vice versa, is minimized. Even greater shifting speed may be attained, while decreasing errors due to the shifting mechanism, by further increasing the number of clutch teeth and reducing their size. The switching action provided by the resilient arm and detent arrangements in such event remains positive and rapid.

Other advantages are provided because the driving gear continuously engages its differential input. The relative motion between the two gears is therefore restricted to a lateral one, wherein clutching difficulties are minimized.

Thus there has been described a simple and efficient mechanical integrator employing positive drive. A large number of individual stages may be employed, with a corresponding increase in accuracy, but without unduly increasing the complexity of the system. The mechanical actions involved are smooth and extremely rapid, although the selecting and driving mechanism is not complicated or expensive. The mechanism responds accurately to minute changes in variables but remains small in size.

What is claimed is:

1. In a mechanical integrating system having a first shaft responsive to a first variable represented in angular position and a second shaft responsive to a second variable represented in rate of rotation, said system including a plurality of stages related in an operational order, each of said stages comprising a differential having a cage output, a shaft input, and a gear input, the output of each of said differentials being coupled to the shaft input of a different succeeding differential, a mechanism for selectively driving the gear inputs of each of said differentials comprising within each stage a clutch hub freely mounted on said second shaft, said clutch hub having first and second toothed surfaces, a protruding gear, a circumferential ring, and a detent groove normal to the longitudinal axis of said second shaft, said protruding gear being in continuous engagement with said differential gear input, a holding clutch concentric with said second shaft and in fixed relation to the differential, said holding clutch having a toothed surface in engageable relation to the first toothed surface on said clutch hub, a driving clutch concentric with and fixed to said second shaft and having a toothed surface in engageable relation to the second toothed surface on said clutch hub, a shifting lever having cam follower surfaces and pivoting about a fixed point normal to the longitudinal axis of said second shaft, a pair of resilient arms mounted in said shifting lever and engaging the circumferential ring of said clutch hub to drive said clutch hub toothed surfaces into engagement alternatively with the toothed surfaces on said driving clutch and holding clutch, cams mounted on said first shaft in operative relation to the cam follower surfaces on said shifting lever to pivot said shifting lever in response to the angular position of said first shaft, and a pair of spring-loaded detent balls operatively disposed adjacent the detent groove in said clutch hub to retain said clutch hub alternatively in engagement with (1) said holding clutch and (2) said driving clutch.

2. The system as set forth in claim 1, wherein in addition the first in order of said stages includes a fixed gear coupled to the shaft input of the differential of said first stage, and a selective driving mechanism for both the fixed gear and said first stage gear input of the differential.

3. A mechanical motion transmitting system comprising a first rotatable shaft, driving clutch means fixed to said first shaft, holding clutch means stationary with respect to said first shaft, clutch engaging means freely mounted on said shaft for sliding movement between positions of engagement with said driving and holding clutch means, first gear means fixed to said clutch engaging means, second gear means continuously engaged by said first gear means to be driven thereby, and means for operating said clutch engaging means, said operating means including a second rotatable shaft, two oppositely related cam means fixed to said second shaft, a pivoted lever having two cam follower means in opposed relation with respect to the pivot of said lever, each of said cam follower means being mounted to engage a different one of said cam means, and a resilient arm connecting said lever to said clutch engaging means and for moving said clutch engaging means between said engagement positions upon pivoting of said lever.

4. A mechanical motion transmitting system comprising a first rotatable shaft, driving clutch means fixed to said first shaft, holding clutch means stationary with respect to said first shaft, clutch engaging means freely mounted on said shaft for sliding movement between positions of engagement with said driving and holding clutch means, first gear means fixed to said clutch engaging means, second gear means continuously engaged by said first gear means to be driven thereby, and means for operating said clutch engaging means, said operating means including a second rotatable shaft, two oppositely related cam means fixed to said second shaft, a pivoted lever having two cam follower means in opposed relation with respect to the pivot of said lever, each of said cam follower means being mounted to engage a different one of said cam means, a resilient arm connecting said lever to said clutch engaging means and for moving said clutch engaging means between said engagement positions upon pivoting of said lever, and detent means engaging said clutch engaging means when in said engagement positions and for tending to prevent movement of said clutch engaging means, whereby said resilient arm is flexed upon pivoting of said lever.

References Cited in the file of this patent

UNITED STATES PATENTS

| | | |
|---|---|---|
| 987,665 | Allen | Mar. 21, 1911 |
| 1,084,671 | Tallmadge | Jan. 20, 1914 |
| 2,177,611 | McLaren | Oct. 24, 1939 |
| 2,322,767 | McLaren | June 29, 1943 |
| 2,521,771 | Bechle | Sept. 12, 1950 |